DIGITAL PHASE-DISPLACEMENT REDUCTION COMBINATION

Filed Jan. 3, 1961 2 Sheets-Sheet 1

INVENTORS
ROBERT S. HAINES
GEOFFREY BATE
JOHN W. WENNER
BY Bernard M. Goldman
ATTORNEY 3,200,386

DIGITAL PHASE-DISPLACEMENT REDUCTION COMBINATION

Robert S. Haines, Geoffrey Bate, and John W. Wenner, Poughkeepsie, N.Y., assignors to International Business Machines Corporation, New York, N.Y., a corporation of New York Filed Jan. 3, 1961, Ser. No. 80,320
3 Claims. (Cl. 340—174.1)

This invention relates generally to means for reducing the phase displacement of data bits read from webbing (or ribbon) types of magnetic tapes. Phase-displacement is a limitation on the maximum bit-packing density obtainable on magnetic tape. The efficiency of magnetic tape is increased by increasing its bit-packing density.

Phase-displacement causes data bits being read to appear displaced from their intended position on the tape. The displacement may cause a pulse being read from tape to appear earlier or later, dependent upon the sequential bit pattern, than other bits of the same character found in parallel tracks, even though they were all written simultaneously by perfectly aligned write heads and were read by perfectly aligned read heads. For example, with NRZI recording only "1" bits are represented by a change of magnetization on the tape surface; and a sequence of "001100" bits in a track will have the "1" bits displaced apart by a greater amount than the spacing of write-current transitions that were responsible for the "1" bits. This type of time-displacement for read bits is often called "phase-shift" or "phase-displacement." The latter term is preferred in this specification.

Insofar as is known, it was not previously recognized that the phase-displacement of data bits could be improved by modifying the orientation of anisotropic particles on magnetic tape. Conventionally, anisotropic particles have been oriented longitudinally in the general direction of read-head flux, which usually is the direction of tape movement. Longitudinal orientation has been found to provide the worst condition of phase-displacement. Several patents involve different means for obtaining conventional longitudinal orientation, such as U.S. patents having Nos. 2,711,901 and 2,796,359, neither being assigned to the present assignee.

Orientation of anisotropic particles has also been suggested for other purposes, such as to prevent print-through with filament records; wherein filament storage spools have direct-contact of recording surfaces among adjacent windings. U.S. Patent No. 2,911,317 is concerned with this problem. However, with webbing tapes, which have a recording only on one side thereof, particle orientation does not help avoid print-through, because the angle between particle axes on adjacent windings is not changed when the orientation angle is changed.

It is therefore the primary object of this invention to provide a magnetic-particle orientation technique for webbing tapes to decrease the phase-displacement of bits read from webbing tapes, discs or drums.

The foregoing and other objects, features and advantages of the invention will be apparent from the following more particular description of preferred embodiments of the invention, as illustrated in the accompanying drawings.

Figure 4:
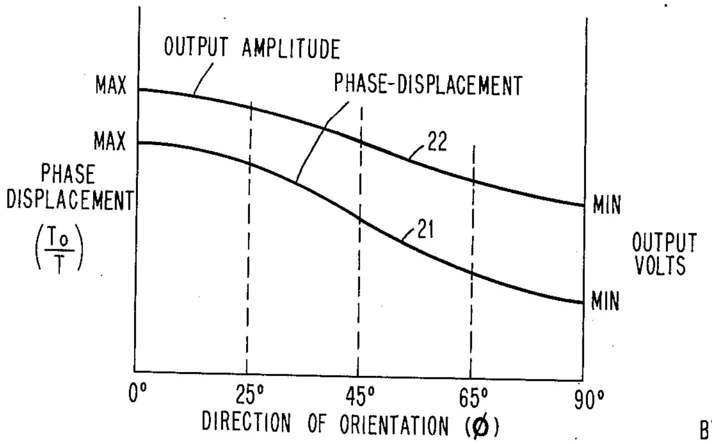
Figures 5A, 5B, 5C:
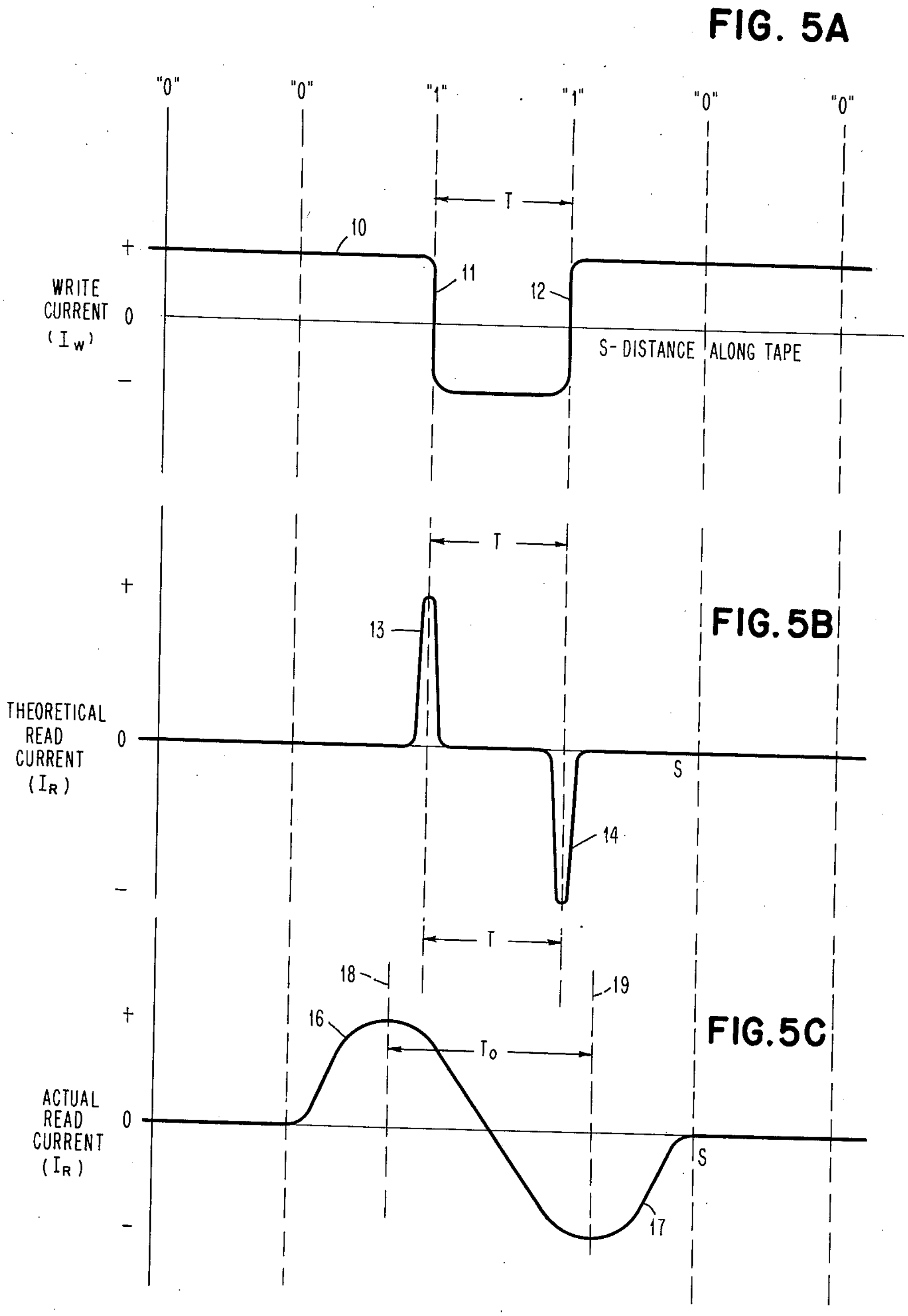

FIGURE 4 provides curves used in explaining the invention; and,

FIGURE 5A, B and C illustrate waveforms used to explain phase-displacement of bits read from a magnetic tape.

Figure 3:
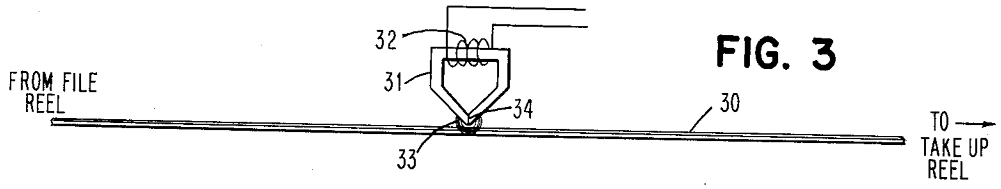
FIGURE 3 shows the relationship between the flux of a magnetic head and a tape surface.

FIGURE 3 illustrates a conventional head 31 and a webbing tape 30. When writing, head 31 presents magnetic flux 33 adjacent to its gap 34; and when reading, induced currents generate a back-flux 33 with the same alignment. Flux 33 passes through the magnetic surface of the tape, generally longitudinally, in the direction of movement of tape 30. Conventionally, anisotropic particles in the tape surface are oriented longitudinally; that is parallel to the general direction of flux lines 33.

With NRZI recording, the flux 33 has sufficient density with either polarity to saturate the magnetic particles in the tape surface immediately adjacent to gap 34. A "1" bit is represented by instantaneous reversal in polarity of the write current, in coil 32, which causes a 180° change in the direction of the saturating flux. "0" bits are represented by no change in the flux status of head 31 at the times when bits are to occur. FIGURE 5A illustrates the write current presented to coil 32 for writing the bit sequence "001100" having a bit period T. Therefore write current transitions 11 and 12 in FIGURE 5A represent "1's."

The recorded tape may be read with head 31. Read current pulses are caused by reversal of flux from magnetized anisotropic particles as they pass a read head.

Theoretically, the recorded bit sequence should generate read currents in coil 32 of the type illustrated in FIGURE 5B, wherein pulses 13 and 14 represent "1" bits. Theoretical pulses 13 and 14 appear at the precise positions on the tape where writing flux transitions 11 and 12 occurred. Thus pulses 13 and 14 have peaks separated by bit period T.

Unfortunately in practice, the peaks of the read pulses will not appear precisely as intended by the write current transitions. Instead the pulse peaks will appear as shown in FIGURE 5C and have peaks spread apart by a time $T_0$ which is larger than bit period T.

Thus a phase displacement for the peaks of pulses 16 and 17 can be seen by comparing FIGURES 5C and 5B. The apparent direction of phase displacement is a function of the data; and therefore the displacement is irregular among the various characters on a tape. A "1" bit bordered by a "1" bit on one side and a "0" bit on the other side appears to be phase-displaced in the direction of the "0" bit. A character gating system must be designed to accommodate necessary phase-displacement tolerances. Character gating becomes easier as the bit density is decreased. As a result, phase-displacement tolerances are at the expense of bit density. Accordingly, reduction of the phase-displacement time ($T_0$—T) will permit greater density of recorded bits upon webbing tape.

Figure 1:
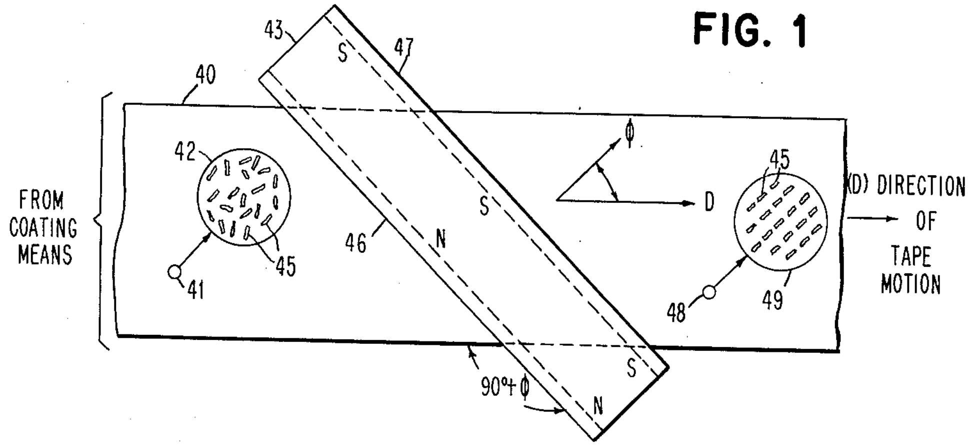
FIGURE 1 illustrates a top view of means for orienting magnetic particles shortly after coating a webbing tape surface.

It has been discovered that there is a relationship between phase-displacement and the orientation angle of the magnetic axis of anisotropic particles within the coating on magnetic tape. FIGURE 1 illustrates how the orientation angle can be controlled during the manufacture of magnetic tape, which in other respects can be manufactured by conventional methods. In FIGURE 1, a tape 40 has a surface coating of anisotropic particles and binder applied to its upper surface by conventional means not shown in FIGURE 1. The technique described in Patent No. 2,711,901 may be used.

The axes of particles in a newly-applied coating will have random orientation. Particles 45 in a very small surface area 41 of the tape are shown magnified within area 42, wherein it is apparent that the axes of particles 45 have no particular orientation.

Figure 2:
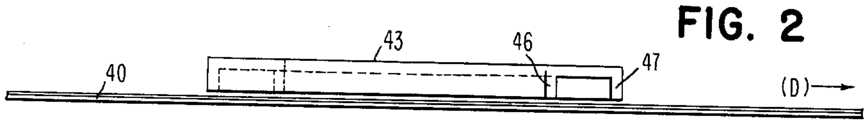
FIGURE 2 is a side view of FIGURE 1.

As the unoriented particles 45 are moved, they come within the field of a magnet 43. Its magnetic field is oriented in the general direction $\phi$ with respect to the direction of movement D of the tape webbing. Magnet 43 has a U-shaped channel cross-section, which is apparent in FIGURE 2. The edges of the cross-section provide opposite poles of magnet 43. The longitudinal direction of channel magnet 43 is therefore perpendicular to direction $\phi$ of its flux, and is $(90°+\phi°)$ with respect to tape movement direction D.

The newly-coated binder is fluid. As the unoriented particles 45 come within the field of magnet 43, they become magnetized and obtain an alignment with the magnetic field. Particle orientation within the fluid binder coating varies as particles pass through magnetic flux of varying directions. However, when they move slightly beyond the magnet, they are pulled into a final alignment which is in the direction $\phi$. The velocity of tape movement must be slow enough to permit the particles to be oriented against the viscous resistance of the fluid coating.

A small oriented area 48 in FIGURE 1 is shown magnified as area 49, wherein it is seen that the particles have their magnetic axes oriented in direction $\phi$. Thereafter, the binder coating is hardened in the conventional manner not further explained herein, since such hardening processes are common to presently manufactured tapes.

The percentage by volume of particles within a total volume of a mixture of particles and binder may be varied within a wide range. As the percentage of particles is decreased, the phase-displacement improves, but the amplitude of read output pulses decreases. Although the particle percentage may be made over 60%, it has been found preferable that the particle percentage be around 40% for a desirable compromise between phase-displacement and output amplitude.

The direction $\phi$ of the flux of magnet 43 may be positioned between about 20° and 90° within this invention to provide a substantial improvement in the phase-displacement properties for the tape. The variation of phase displacement with orientation angle $\phi$ is given by curve 21 in FIGURE 4. As previously stated herein, phase displacement may be measured by the ratio $T_0/T$. The maximum and worst condition of phase displacement is at 0° of orientation, which is provided with conventional tapes. The phase displacement does not change much when orientation $\phi$ is between 0° and 20°. Beyond 20°, the phase displacement improves at a faster rate; but the rate decreases as 90° is approached.

As orientation angle $\phi$ is varied for any given percentage of particles, the amplitude of the pulse peaks during reading of the tape is affected. Curve 22 in FIGURE 4 illustrates this phenomenon. The amplitude varies from a maximum at 0° for $\phi$ to a minimum at 90°. Although minimum output amplitude occurs at 90°, it was never less than 50% of the maximum output for percentages greater than 10% of $\gamma$-$Fe_2O_3$. Therefore, the output amplitude was found sufficient at all orientation angles for use in practical tape systems. However, an optimum compromise between phase displacement and output amplitude is obtained in the range of about 45°±20° for most systems.

However, the minimum output at 90° varies with the percentage of anisotropic particles within the tape coating. As the percentage becomes higher, the minimum output at 90° becomes larger, although maximum output at 0° does not correspondingly increase. However, as the percentage becomes larger, a decrease in improvement of phase displacement occurs with variation of orientation angle $\phi$. That is, when the concentration of anisotropic particles is increased beyond 60%, curves 21 and 22 in FIGURE 4 tend to approach horizontal lines, with the average amplitude increasing, and the average improvement in phase displacement decreasing.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Digital phase-displacement reduction means comprising,
   - a recording or reading device having at least one gap therein,
   - a flat substrate having one side coated with a magnetic surface oriented with an easy direction of magnetization,
   - means providing a direction of relative motion between said substrate and said recording or reading device,
   - the easy direction of magnetization being at an angle within the range of 20° to 90° with respect to said direction of relative motion of said recording or reading device,
   - and said gap being substantially transverse to said direction of relative motion,
   - whereby low interdigital phase-shift effects are obtained with respect to adjacent data bits read by said gap.

2. An interdigital phase shift reduction means comprising,
   - a substrate having one surface coated with magnetic anisotropic particles supported in a non-magnetic binder material,
   - tape reading or writing means positioned adjacent said coated surface,
   - means providing relative motion between said reading or writing means and said surface,
   - said anisotropic particles having an average direction of orientation at an angle within the range of 20° to 90° from said direction of relative motion,
   - and at least one gap in said reading or writing means being oriented substantially transverse to said direction of relative motion.

3. Interdigital phase shift reduction means comprising,
   - a recording head having at least one gap therein,
   - a tape having a magnetic coating thereon engaging said head,
   - means providing relative motion between said tape and said head,
   - magnetic particles in said magnetic coating being oriented at an average angle within the range of 20° to 90° with respect to said direction of relative motion,
   - and the gap of said head being angled substantially transverse to the direction of relative motion,
   - whereby low phase displacement occurs between successive digits recorded on said web.

References Cited by the Examiner

UNITED STATES PATENTS

| | | | |
|---|---|---|---|
| 2,635,149 | 4/53 | Cain | 179—100.2 |
| 2,796,359 | 6/57 | Speed | 179—100.2 X |
| 2,993,096 | 7/61 | Radocy | 179—100.2 |
| 3,026,215 | 3/62 | Fukuda et al. | 179—100.2 X |

IRVING L. SRAGOW, *Primary Examiner.*

BERNARD KONICK, NEWTON N. LOVEWELL, *Examiners.*